United States Patent [19]

Shirata et al.

[11] Patent Number: 5,041,776
[45] Date of Patent: Aug. 20, 1991

[54] MOTOR VEHICLE POWER SUPPLY DEVICE

[75] Inventors: Akihiro Shirata, Yokohama; Toshifumi Koshizawa, Kawasaki; Yuichi Koyama, Machida; Yoshinobu Tsuchiya, Fujisawa, all of Japan

[73] Assignee: Isuzu Motors Limited, Tokyo, Japan

[21] Appl. No.: 501,747

[22] Filed: Mar. 30, 1990

[30] Foreign Application Priority Data

Aug. 10, 1989 [JP] Japan .................................. 1-207146

[51] Int. Cl.⁵ .......................... H02J 7/14; F02N 11/00; H02P 9/00
[52] U.S. Cl. ........................................ 320/1; 290/38 R
[58] Field of Search ................. 320/64, 1; 322/29, 28, 322/73; 290/38 R

[56] References Cited

U.S. PATENT DOCUMENTS

| | | | |
|---|---|---|---|
| 3,753,001 | 8/1973 | Hiroshima et al. | 320/1 X |
| 3,982,169 | 9/1976 | Cummins | 322/28 |
| 4,368,417 | 1/1983 | Matsuyama | 322/29 |
| 4,739,244 | 4/1988 | Komurasaki et al. | 322/29 |

*Primary Examiner*—R. J. Hickey
*Attorney, Agent, or Firm*—Staas & Halsey

[57] ABSTRACT

A motor vehicle power supply device includes an alternator drivable by an engine mounted on a motor vehicle, a battery chargeable by electric energy generated by the alternator, a capacitor connected to the alternator and the battery, and a charging speed varying circuit arrangement connected between the capacitor, and the alternator and the battery, for varying the speed at which the capacitor is charged. The charging speed varying circuit arrangement is controlled to vary the speed at which the capacitor is charged, depending on the operating condition of the motor vehicle.

6 Claims, 1 Drawing Sheet

5,041,776

MOTOR VEHICLE POWER SUPPLY DEVICE

BACKGROUND OF THE INVENTION

The present invention relates to a motor vehicle power supply device for energizing a starter motor when an engine mounted on a motor vehicle is to be started.

Lead storage batteries are mounted on motor vehicles as a power supply for an engine starter and other electric loads such as accessories.

When the engine is to be started, electric energy stored in the lead storage battery is supplied to energize the starter motor. A pinion gear of the starter motor is brought into mesh with a ring gear mounted on the crankshaft of the engine, and rotated to rotate the crankshaft, thereby starting the engine.

An electric current which is supplied from the battery to the starter motor when starting the engine is very high, e.g., 100A or more, though it is supplied in a short period of time. The capacity of a battery to be installed on a motor vehicle is determined primarily in view of its ability to start the engine. The large electric power which is consumed to start the engine is supplemented when the battery is charged by electric power generated by an alternator mounted on the motor vehicle and driven by the engine while the motor vehicle is running.

Batteries mounted on motor vehicles are known lead batteries as secondary batteries, and they are charged and discharged through a chemical reaction between electrodes and an electrolytic solution. Such a battery can discharge a large current within a short period of time. The battery is charged with a current of 10A or less which is supplied over a long period of time and through a gradual chemical reaction. Therefore, if a much larger current is supplied to charge the battery, the battery would be excessively heated and the electrodes might be deformed and damaged.

Motor vehicles which are mainly used by commuters run over short distances, and motor vehicles used as delivery cars are repeatedly stopped and started highly frequently. Since these motor vehicles require the engines to be started frequently and are continuously driven over short periods of time, the batteries mounted on these motor vehicles cannot be charged sufficiently enough to make up for the electric power consumed when the engines are started. Accordingly, the batteries tend to be used up, or run down, failing to start the engines.

To solve the above problems, the applicant has proposed a motor vehicle power supply device which has a large-capacitance capacitor that is charged by a battery mounted on the motor vehicle and that discharges stored electric energy to actuate the engine starter to start the engine (see Japanese Patent Application No. 63(1988)-329,846, U.S. patent application Ser. No. 454,267 and EPC Patent Application No. 89313559.0.

With the proposed motor vehicle power supply devices, the engine starter is energized by the electric energy stored in the large-capacitance capacitor. The large-capacitance capacitor can supply an intensive current. Therefore, even if the voltage of the battery is somewhat lowered, the engine may be started by the electric energy stored in the capacitor. To charge the capacitor after its stored electric energy has been discharged, a sudden large current is required since the internal resistance of the capacitor is small at the time it is charged, and hence the alternator is subjected to a large stress. While the engine is idling at low temperature, the engine may possibly die if the load on the alternator is large. If the alternator load is large, the engine may also not be revved up with a quick response when the motor vehicle is to be started or accelerated.

SUMMARY OF THE INVENTION

It is an object of the present invention to provide a motor vehicle power supply device which has a large-capacitance capacitor that can be charged by a battery and an alternator driven by an engine mounted on a motor vehicle, the motor vehicle power supply device having means for reducing adverse effects on operation of the engine at the time of charging the large-capacitance capacitor.

According to the present invention, there is provided a motor vehicle power supply device comprising an alternator drivable by an engine mounted on a motor vehicle, a battery chargeable by electric energy generated by the alternator, a capacitor connected to the alternator and the battery, charging speed varying means connected between the capacitor, and the alternator and the battery, for varying the speed at which the capacitor is charged, detecting means for detecting an operating condition of the motor vehicle, and control means for controlling the charging speed varying means in response to detected signals from the detecting means.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
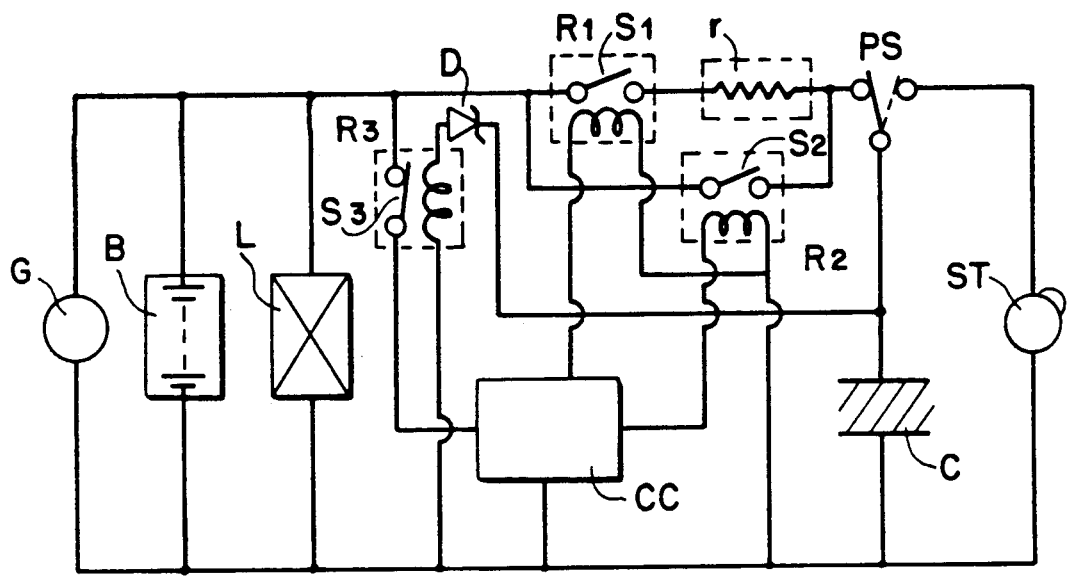
Fig. 1 is a circuit diagram of a motor vehicle power supply device according to an embodiment of the present invention.

As shown in FIG. 1, an alternator G which is driven by the torque of an engine (not shown) serves as an electric power source to supply electric energy to a load L on a motor vehicle, charge a battery B, and also charge a large-capacitance capacitor C.

The capacitor C comprises an electric double layer capacitor having a large electrostatic capacitance and is of the wet type employing active carbon and an aqueous solution. The electric double layer capacitor C has a volume which is one tenth or smaller of the volume of a conventional aluminum-electrolytic capacitor that has the same electrostatic capacitance as that of the capacitor C. Typically, the electric double layer capacitor C has a capacitance ranging from 30 to 50F (farads). When the engine is to be started, a power switch PS is shifted as indicated by the broken line in FIG. 1, supplying electric energy from the capacitor C to a starter ST to energize the starter ST with the electric energy which has relatively sharp rising characteristics.

Relay circuits R1, R2 are controlled by a control circuit CC. The relay circuits R1, R2 have respective contacts S1, S2 for opening and closing a circuit for charging the capacitor C. The contact S1 is connected in series with a resistor r which limits the current that is supplied to charge the capacitor C. The relay circuits R1, R2 have respective coils connected to the control circuit CC.

A relay circuit R3 has a normally closed contact S3 for controlling energization of the control circuit CC. The relay circuit R3 has a coil connected in series with a zener diode D. When the capacitor C is sufficiently charged and the voltage thereacross is higher than a predetermined voltage, the contact S3 is opened to de-energize the control circuit CC, thereby interrupting the control function thereof.

Figure 2:
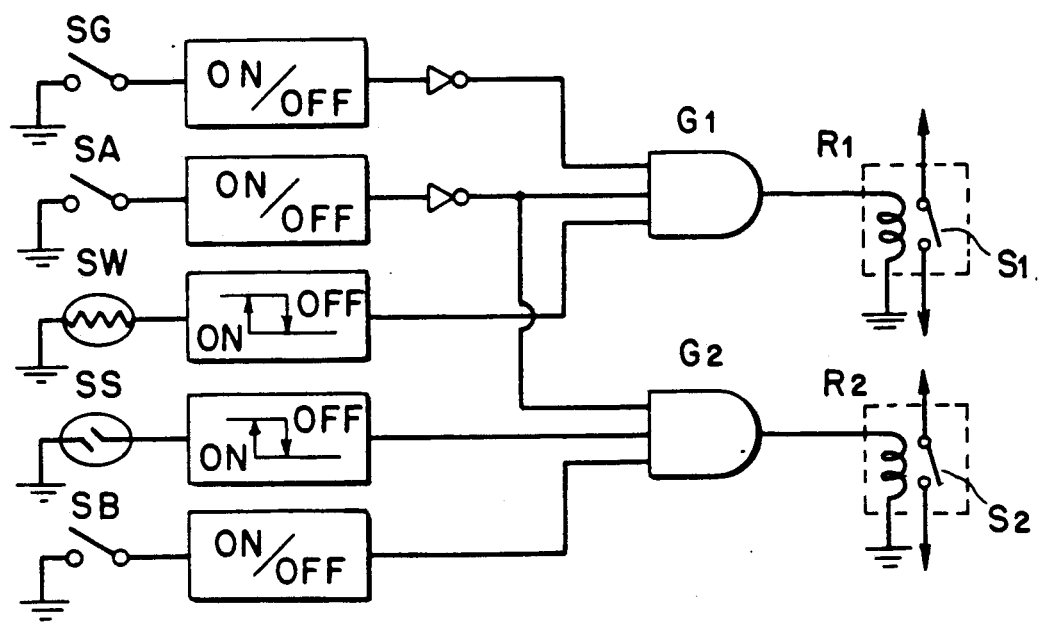
FIG. 2 is a circuit diagram of a control circuit in the motor vehicle power supply device shown in FIG. 1.

The control circuit CC serves to vary the time in which to charge the capacitor C depending on the operating conditions of the motor vehicle. FIG. 2 shows the control circuit CC in greater detail. In response to signals from various switches and sensors that are located in various parts of the motor vehicle, the control circuit CC selectively energizes the relay circuit R1 or R2.

In FIG. 2, the control circuit CC is connected to various switches and sensors. The switches include a gear position switch SG which is turned on when the transmission of the motor vehicle is shifted into one of the gear positions for moving the motor vehicle, an accelerator pedal switch SA which is turned on when the accelerator pedal is depressed, and a brake switch SB which is turned on when the brake pedal is depressed. The sensors include a coolant temperature sensor SW which is turned on when the temperature of an engine coolant reaches a predetermined temperature, and a vehicle speed sensor SS which is turned on when the speed at which the motor vehicle runs reaches a predetermined speed. A signal from the gear position switch SG is applied through an inverter to an AND gate G1. A signal from the accelerator pedal switch SA is applied through an inverter to the AND gate G1. A signal from the coolant temperature sensor SW is applied to the AND gate G1. The signal from the accelerator pedal switch SA is also applied through the inverter to an AND gate G2. A signal from the vehicle speed sensor SS and a signal from the brake switch SB are applied to the AND gate G2. The AND gate G1 has an output terminal connected to the coil of the relay circuit R1, whereas the AND gate G2 has an output terminal connected to the coil of the relay circuit R2.

Operation of the motor vehicle power supply device according to the present invention will be described below.

In order to charge the capacitor C, the power switch PS is shifted to a solid-line position shown in FIG. 1. When the motor vehicle is started or accelerated, the gear position switch SG is turned on since the transmission is one of the gear positions for moving the motor vehicle, and the accelerator pedal switch SA is also turned on since the accelerator pedal is depressed. Therefore, the output signals of the AND gates G1, G2 of the control circuit CC are low, and the relay circuits R1, R2 are not energized. Therefore, electric energy generated by the alternator G is not supplied to the capacitor C, and the engine is not subjected to any load which would otherwise be imposed by the generated electric energy. Therefore, the torque produced by the engine is consumed to accelerate the motor vehicle.

While the engine is idling, the transmission is in a neutral position. Therefore, the gear position switch SG is turned off. The accelerator pedal switch SA is also turned off since the accelerator pedal is not depressed. When the temperature of the engine coolant reaches a predetermined temperature and the coolant temperature sensor SW is turned on, the AND gate G1 produces a high output signal which energizes the relay circuit R1. Since the contact S1 is closed, the electric energy from the alternator G is supplied through the resistor r, which then supplies a limited current to charge the capacitor C. Therefore, an abrupt large current is prevented from being supplied to the capacitor C. During the idling of the engine, any load imposed on the engine by the generation of electric energy by the alternator G is reduced, and the engine is prevented from dying.

When the motor vehicle is decelerated, as long as the speed of the motor vehicle is higher than a predetermined speed, the vehicle speed sensor SS is turned on. The accelerator pedal switch SA is turned off as the accelerator pedal is not depressed, and the brake switch SB is turned on as the brake pedal is depressed. Therefore, the output signal from the AND gate G2 is high, thereby energizing the relay circuit R2. The contact S2 is closed, and the electric energy from the alternator G is directly supplied to charge the capacitor C. At this time, the travel of the motor vehicle is not adversely affected since the torque of the engine is sufficiently large during deceleration.

The capacitor C is charged while the engine is idling or the motor vehicle is being decelerated. When the voltage across the capacitor C reaches a predetermined voltage at the final charging stage, the zener diode D and the relay circuit R3 are operated to cut off the electric energy which has been supplied to the control circuit CC. The capacitor charging control operation of the control circuit CC is therefore caused to cease.

With the present invention, the magnitude of the load on the engine is determined depending on the signals from the switches and sensors that are located in various parts of the motor vehicle and indicate the operating condition of the motor vehicle. When the motor vehicle is started or accelerated, requiring the engine to produce its output torque, as determined by the determined magnitude of the engine load, the capacitor C is prevented from being charged. When the engine torque is sufficiently large as during deceleration of the motor vehicle, the capacitor C is charged fully by the electric energy produced by the alternator. Therefore, the charging circuit is controlled depending on the operating condition of the motor vehicle. Any adverse effects which the electric energy for charging the capacitor has on the operation of the engine are reduced. As a consequence, the engine is prevented from dying while it is being idling, and the response of the engine during acceleration of the motor vehicle is prevented from becoming slow.

Although a certain preferred embodiment has been shown and described, it should be understood that many changes and modifications may be made therein without departing from the scope of the appended claims.

What is claimed is:

1. A motor vehicle power supply device for supplying power to a starter, comprising:
   an alternator drivable by an engine mounted on a motor vehicle;
   a battery chargeable by electric energy generated by said alternator;

capacitor means, connected to said alternator and said battery and switchably connectable to the starter, for providing power to the starter;

charging speed varying means connected between said capacitor, and said alternator and said battery, for varying the speed at which said capacitor means is charged;

detecting means for detecting an operating condition of the motor vehicle; and control means for controlling said charging speed varying means in response to detected signals from said detecting means.

2. A motor vehicle power supply device according to claim 1, wherein said capacitor means comprises an electric double layer capacitor.

3. A motor vehicle power supply device according to claim 1, wherein said charging speed varying means comprises a plurality of parallel circuits connected to said capacitor means and having respective switch means, one of said parallel circuits having a resistor for limiting a current flowing through said one of the parallel circuits.

4. A motor vehicle power supply device according to claim 3, wherein said control means comprises means for opening said switch means of said parallel circuits to stop charging said capacitor means when the motor vehicle is started and accelerated, based on the detected signals from said detecting means.

5. A motor vehicle power supply device according to claim 3, wherein said control means comprises means for closing said switch means of said one of the parallel circuits to charge said capacitor means through said resistor when the engine idling, based on the detected signals from said detecting means.

6. A motor vehicle power supply device according to claim 3, wherein said control means comprises means for closing said switch means of the other of the parallel circuits to charge said capacitor means through said other circuit when the engine is decelerated, based on the detected signals from said detecting means.

* * * * *